(12) United States Patent
Rowe

(10) Patent No.: US 6,422,152 B1
(45) Date of Patent: Jul. 23, 2002

(54) SLIDING DOLLY

(75) Inventor: James R. Rowe, P.O. Box 5347, Huntington, WV (US) 25703

(73) Assignee: James R. Rowe, Huntington, WV (US)

( * ) Notice: Subject to any disclaimer, the term of this patent is extended or adjusted under 35 U.S.C. 154(b) by 0 days.

(21) Appl. No.: 09/100,625

(22) Filed: Jun. 19, 1998

(51) Int. Cl.⁷ .............................................. B61B 13/04
(52) U.S. Cl. ..................... 104/121; 105/146; 105/147; 414/529; 280/47.24
(58) Field of Search ......................... 104/121; 105/146, 105/147, 355; 280/47.17, 47.24, 47.27, 47.29; 414/529, 542, 491, 507

(56) References Cited

U.S. PATENT DOCUMENTS

| | | | | |
|---|---|---|---|---|
| 3,295,881 A | * | 1/1967 | Worthington | 414/542 |
| 4,240,353 A | * | 12/1980 | Barth | 104/93 |
| 4,532,385 A | * | 7/1985 | Friske | 191/23 A |
| 4,561,359 A | * | 12/1985 | Duce | 104/94 |
| 4,620,486 A | * | 11/1986 | Gronau et al. | 104/121 |
| 4,721,043 A | * | 1/1988 | Pudney et al. | 104/121 |
| 5,683,220 A | * | 11/1997 | Oh et al. | 414/529 |

* cited by examiner

Primary Examiner—Frantz F. Jules
(74) Attorney, Agent, or Firm—Frost Brown Todd LLC

(57) ABSTRACT

A sliding dolly that is particularly adapted to loading and unloading awkward and heavy packages, mattresses, or box springs from a truck. There is a, a dolly back frame, and a dolly shelf. There is also a means for supporting the dolly over a floor or other surface. This support means may be a slider and or roller assembly. In the preferred embodiment, both the back frame and the roller assembly are joined to the shelf. The back frame is joined to and depends from the slider. The slider permits the attached back frame, shelf, and roller assembly to move along the slider. The slider is typically fastened along one of the sides of a truck near the corner where the top and sides meet. The roller assembly has one or more casters that reduce the friction of moving the sliding dolly along the side of the truck by holding the dolly back frame and shelf away from the side of the truck. A mattress, box spring or other heavy and large or awkward package is placed on the shelf, and then the truck driver or person unloading the truck would simply slide the sliding dolly to the rear of the truck where the mattress or other object being carried would be transferred to a fork lift or other mechanism for unloading or transferring the goods in the warehouse.

20 Claims, 7 Drawing Sheets

SLIDING DOLLY

BACKGROUND OF THE INVENTION

1. Field of the Invention

This invention relates generally to dollies and other devices used to move heavy or awkward loads by hand, and more particularly to dollies that are used to carry or move heavy or awkward objects within trucks or other confined areas.

2. Description of the Related Art

Dollies, hand trucks, and the like, together with raw manpower have long been used to load and unload trucks. The use of many people to load or unload a truck or to move heavy and/or awkward objects is becoming less and less attractive as the cost of the hourly wage increases. In addition to the labor costs are the costs associated with an on the job injury to one of these workers. These costs include both the cost of Worker's Compensation Insurance and the cost associated with the loss of the injured individual's labor for a period of time while the injury heals. During the period of time when a person is absent from work due to an injury, not only does an employer usually have to pay the absent worker, the employer may also have to pay the wages of a replacement worker who may be unfamiliar with the employer's operations.

Moving, loading, or unloading of heavy or awkward to carry items raises the risk substantially of a worker being injured. While the use of conventional handcarts, hand trucks, dollies and the like can prevent many injuries, these unloading and loading tools are not effective for all types of cargo. For example, a large king size mattress can weigh as much as two hundred pounds and have dimensions exceeding six feet long, six feet wide, and fourteen inches high. Moving a large mattress using a hand truck or dolly can be very difficult in the confines of a truck. The regular dolly or hand truck has a relatively narrow shelf and wheelbase compared to the width or length of a mattress. A typical dolly will have a wheel base and shelf width of approximately two feet. Occasionally, a hand truck will have a shelf width or wheelbase of three feet. The wider hand trucks, however, are heavier and more difficult to maneuver. The combination of a confined area, a narrow shelf width, and a large bulky package or mattress to be moved makes for a time-consuming and difficult operation using the dolly. This difficulty is accentuated when trying to carry a mattress on a standard dolly or hand truck, since the width of the mattress is perpendicular to the direction of travel. Since moving a mattress with a dolly is awkward, a mattress or box spring is often carried by hand with the associated risks already discussed. An additional disadvantage of a hand truck or dolly is that the hand truck or dolly must either be left on the loading dock or securely fastened inside the truck to prevent damage to the packages, mattresses or other cargo being carrier. Typically, the hand truck or dolly would be tied to one side or the other at the back of the truck. Furthermore, the space taken up by the dolly is space in which a mattress or other cargo can not be carried, thus reducing the total load carrying capacity of the truck.

Modern mattresses are both heavy and awkward for one person to carry or more with a hand truck or dolly, and are awkward for two people to carry, Therefore, a dolly is needed that will enable a truck driver or other worker to quickly and easily move a mattress, box spring, or other heavy and awkward package in a truck or other confined area while minimizing the risk of injury to the worker.

SUMMARY OF THE INVENTION

The present invention has solved the package handling problems cited above and generally comprises a sliding dolly. There is a dolly back frame, and a dolly shelf. Additionally, depending on the embodiment used, there may be a slider and/or roller assembly. In the embodiment that is similar to a hand dolly, there is a roller assembly that is joined to the back frame or shelf such that the rollers or other support means support the sliding dolly and permit the dolly to move over a generally horizontal surface such as a truck, container, or warehouse floor. In an alternative embodiment, the slider may provide both a means for supporting and a means for guiding the sliding dolly. Other embodiments may use a roller assembly combined with a slider. In some of these embodiments, the roller assembly can provide the primary means for supporting the dolly and the slider can provide the primarily guide means for the dolly. Alternatively, the roller assembly may share the support function with the slider. In the preferred embodiment, the slider primarily provides both the means for supporting and the means for guiding the sliding dolly and the roller assembly provides the means for holding the dolly away from a truck side, wall, or other generally vertical surface to which the slider may be attached.

In the preferred embodiment, both the shelf and the roller assembly are joined to the back frame. In some embodiments, the roller assembly may be joined to the connection between the frame and the shelf or to the shelf, The back frame is joined to and depends from the slider. The slider permits the attached back frame, together with the shelf and roller assembly to move along the slider. The slider is typically fastened along one of the sides of a truck, container, or other confined area. The roller assembly, if used, has one or more devices that reduce the friction of moving the sliding dolly along the side of the truck by holding the dolly back frame and shelf away from the side of the truck. A mattress, box spring or other heavy and large or awkward package is placed on the shelf, and then the truck driver or person unloading the truck would simply move the sliding dolly to the rear of the truck where the mattress or other object being carried would be transferred to a fork lift or other mechanism for unloading or transferring the goods in the warehouse.

An object of the present invention is to provide a sliding dolly that will permit a truck driver or other person moving objects in a truck, container, or other confined area to easily move packages, mattresses or other similar objects.

It is a further object of the present invention to provide a sliding dolly which has a shelf that can be folded upward and the dolly secured to the inside of the truck to prevent damage to the cargo being carried through movement of a loose dolly.

It is a further object of the present invention to provide a dolly whose general direction of motion is parallel to the width of the load.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

BRIEF DESCRIPTION OF THE DRAWINGS

The accompanying drawings incorporated in and forming part of the specification illustrate several aspects of the present invention, and together with the description served to explain the principles of the invention. In the drawings.

Reference will be made in detail to the present preferred embodiment of the invention, an example of which is illustrated in the accompanying drawings.

DETAILED DESCRIPTION OF THE PREFERRED EMBODIMENT

The purpose of the sliding dolly 10 is to provide a device that will permit a truck driver or warehouse worker to easily and safely load, unload, or move large and awkward packages in a truck, container or other confined area. Thus, both the trucking company the warehouse owner, and other employers will have improved productivity through fewer injuries to their employees and consequently lower Worker's Compensation Insurance rates.

Figure 1:
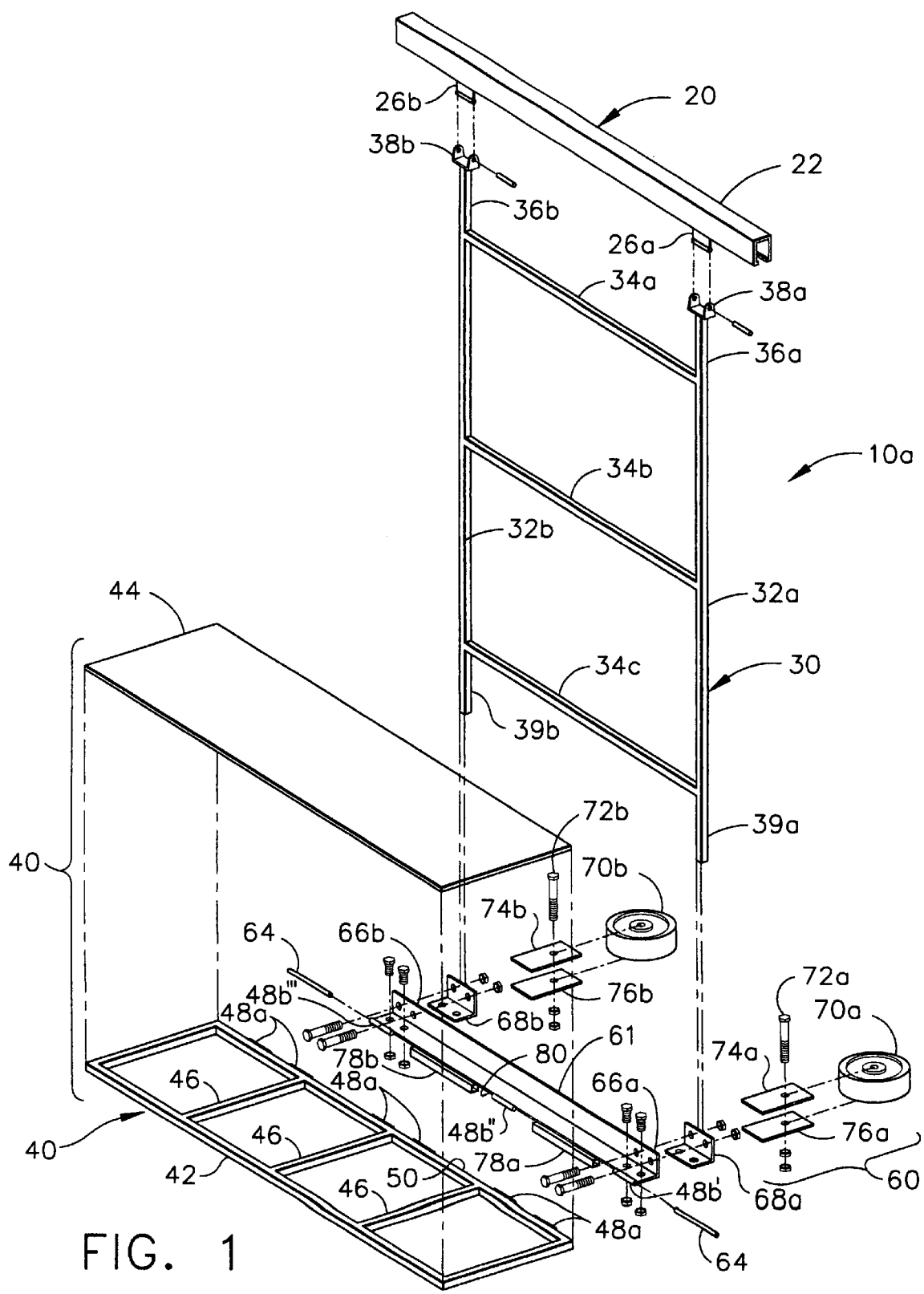
FIG. 1 is an exploded perspective view of a sliding dolly in accordance with the present invention.

Referring now to the drawings in detail wherein like numerals indicate the same elements throughout the views, FIG. 1 shows an exploded view of a first embodiment of sliding dolly 10a. In the embodiment shown, there is a slider 20, a dolly back frame 30, a dolly shelf 40, and an optional roller assembly 60. Both shelf 40 and roller assembly 60, if used, are joined to back frame 30. Roller assembly 60 includes at least one roller 70 that holds dolly 10a away from the side of the truck to reduce the friction generated between the back frame 30 of dolly 10a and the side of the truck, container or wall when moving sliding dolly 10a.

Typically, slider 20 will permit dolly 10a to move along the length of the truck or other confined area. The roller assembly 60 may be integrated into the connection between the back frame 30 and the shelf 40. Although the shelf may be fixed, or even removable, preferably there is a pivot or hinge-type connection, whereby shelf 40 may be folded up along back frame 30 to reduce the amount of space (volume) taken up by sliding dolly 10a. Slider 20 is connected to the upper end of back frame 30.

Figure 2:
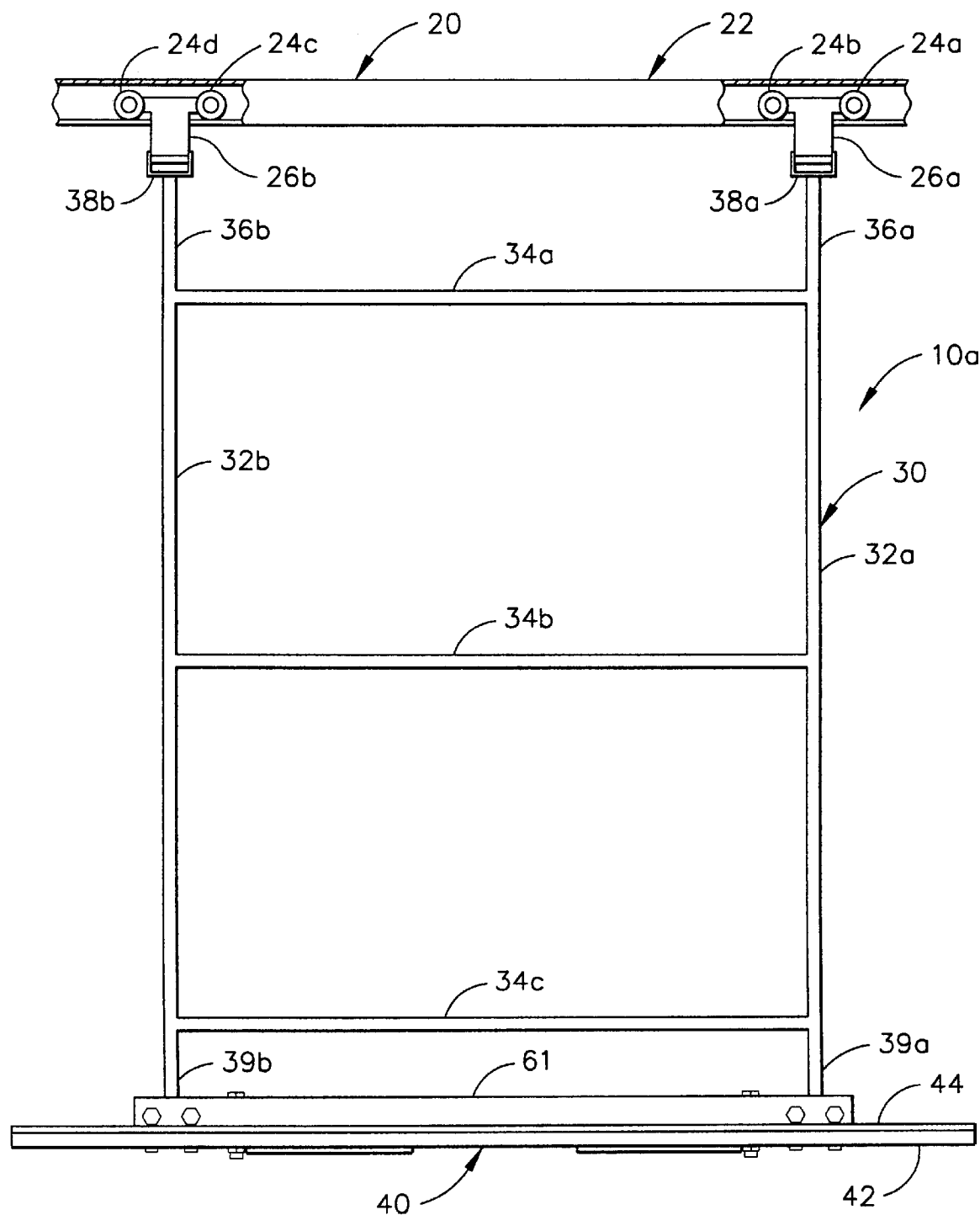
FIG. 2 is a front view of the sliding dolly and a longitudinal cross-section of the slider shown in FIG. 1.

With reference now to FIG. 2 showing a cut away view of slider 20. Slider 20 is typically a commercially available barn door track and roller assembly. However, slider 20 may be any device that is capable of guiding dolly 10a in the truck, container, or other confined area. Additionally, in some embodiments, slider 20 may provide a means for supporting the loads that are carried by sliding dolly 10a. Preferably, slider 20 will extend the length of the truck, container or confined area to permit sliding dolly 10a to move along the entire length. Slider 20 may employ wheels or other bearing surfaces to reduce friction of moving sliding dolly 10a. In the embodiment shown, there is a track 22, rollers 24a–d, roller carriage 26a connecting rollers 24a and 24b together, with roller carriage 26b connecting rollers 24c and 24d together. Preferably, slider 20 is a commercially available barn door track assembly. A 2½-inch barn door track has been found suitable for carrying mattresses.

Figure 3:
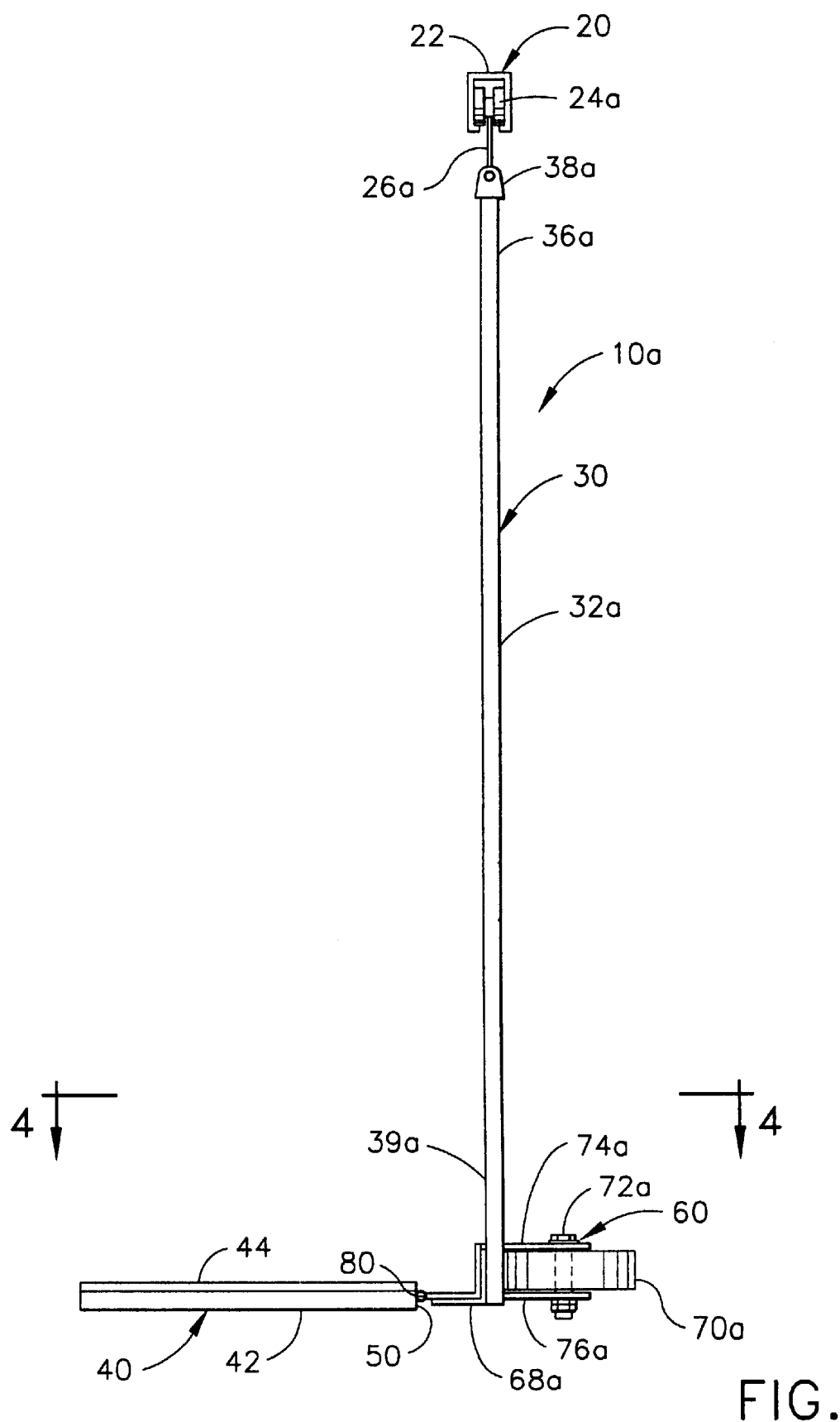
FIG. 3 is a side view of the sliding dolly shown in FIG. 1.
Figure 4:
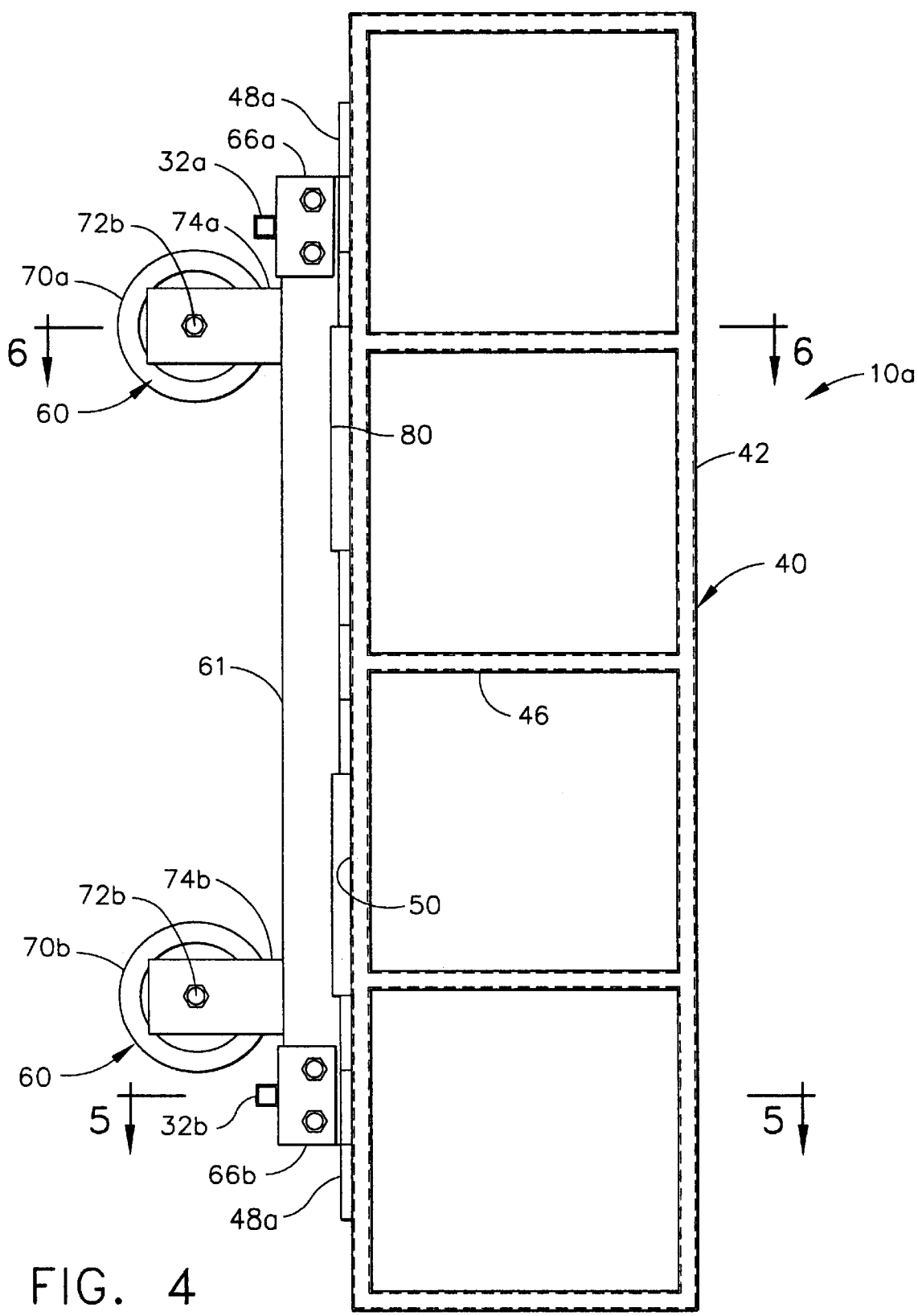
FIG. 4 is a cross section showing the top view of a shelf without a shelf board taken at 4—4 of FIG. 3.
Figure 5:
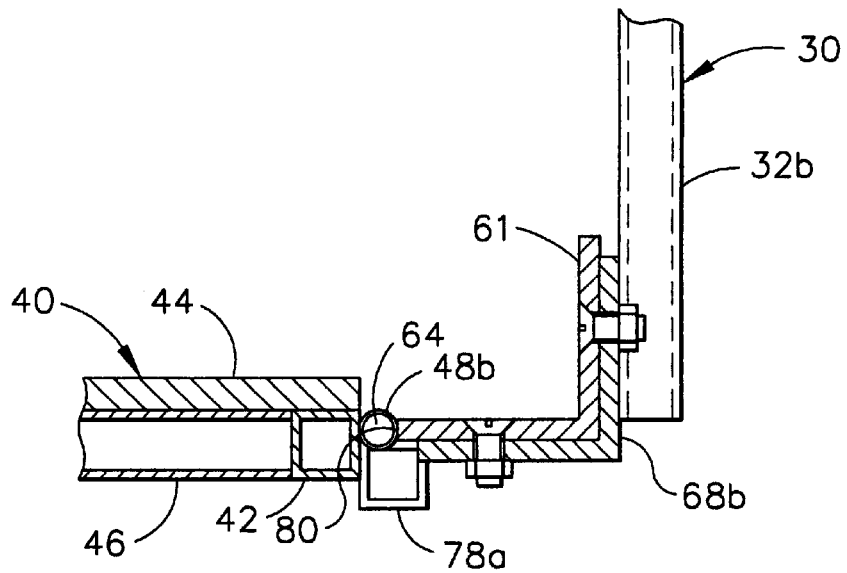
FIG. 5 is an enlarged fragmentary detail of the connection between the dolly back frame and the roller assembly and the connection between the dolly shelf and the roller assembly.

In some embodiments, there may be a single roller 24 for each roller carriage 26. As can be clearly seen in FIG. 3, track 22 is generally "C" shaped with carriage 26 riding in the slot formed by track 22. Each roller 24 may be a single roller or a pair of rollers as shown in FIG. 3. Each roller 24 rides inside track 22 and permits each respective carriage 26 to slide along track 22. Each roller carriage 26 is connected to back frame 30.

Typically, sliding dolly 10a will utilize at least two roller carriages 26a and 26b to provide stability to dolly 10a and to prevent dolly 10a from tipping when loaded. A useable sliding dolly 10a, however, may be constructed using a single carriage 26 and one or more rollers 24. If a single carriage 26 and a single roller 24 are utilized then the track 22 must be able to support the point load applied by the roller 24. Additionally, the load must be placed on dolly 10a in such a manner as to prevent the load from falling off the dolly 10a due to the tipping of dolly 10a if the load was not balanced when placed on dolly 10a.

With reference back to FIG. 2, back frame 30 can be any configuration of members that will provide adequate support for the load being carried on sliding dolly 10. In the embodiment shown, back frame 30 has two vertical supports 32a and 32b and three cross pieces 34a–c. Each end of each cross piece 34 is welded, joined or otherwise fastened to each vertical support 32. Typically, cross pieces 34 divide vertical supports 32 in approximately equal length sections. Each vertical support 32a and 32b has a respective carriage end 36a and 36b that is connected to a respective yoke 38a and 38b. Each respective yoke is pivotally connected to a respective roller carriage 26a and 26b. The use of a yolk 38 permits the back frame 30 to pivot away from the wall of the truck about a lower end of carriage 26. The pivoting of back frame 30 aids in reducing the friction and potential binding that could result if the truck side was not straight. Each vertical support 32a and 32b has a respective shelf end 39a and 39b. In the preferred embodiment, each shelf-end 39 is fastened to crossbeam 61 of shelf 40. Alternatively, shelf 40 may be permanently, both foldable or non-foldable, or removeably fastened or joined to back frame 30 anywhere the user desires on frame 30. Example methods include welding, fastening with threaded fasteners, or a tab and slot configuration that would permit shelf 40 to be removably attached to frame 30.

As is known in the art, shelf 40 may be formed from single or multiple members. With reference back to FIG. 1, shelf 40 is shown with a shelf frame 42 that supports a shelf board 44. Shelf board 44 may be made out of plywood, particleboard, chipboard, plastic sheet or other relatively light, tough, and inexpensive sheet material. Typically, shelf frame 42 will be made from the same material as back frame 30. The preferred material is carbon steel square tubing due to its low cost and relatively high strength and toughness. Shelf frame 42 may have one or more cross pieces 46 to provide additional support to shelf board 44. Typically, cross pieces 46 are welded to frame 42. Preferably, cross pieces 46 divide frame 42 into approximately equal sized sections. Typically, frame 42 is welded from four pieces of square tube. Shelf 40 may also have shelf hinges 48a welded or fastened to the crossbeam side 50 of shelf frame 42. Shelf hinges 48 form a hinge connection between shelf frame 42 and crossbeam 61. Preferably, pin 64 will connect at least two shelf hinges 48a to crossbeam hinge 48b, with crossbeam hinge 48b positioned between the two shelf hinges 48a and forming a hinge connection thereby.

Typically, crossbeam 61 is a steel angle (FIG. 1). Preferably, crossbeam 61 is formed from an angle having equal legs. On the front 80 of crossbeam 61 are crossbeam hinges 48b, which are connected thereto by any method such as welding. At each end 66a or 66b of crossbeam 61 (FIG. 1), there may be a reinforcement plate 68a and 68b. Each reinforcement plate 68 typically is fastened to crossbeam 61 with threaded fasteners. Alternatively, reinforcing plates 68a and 68b may be attached to crossbeam 61 by welding, bonding with an adhesive, or any other known method. Typically, reinforcing plates 68a and 68b will be made of the same material as crossbeam 61. Each lower end 39a and 39b of back frame 30 may be joined to a respective reinforcing plate 68a or 68b. This joint may use fasteners, welds, or adhesives. Alternatively, crossbeam 61 may be any member that is capable of attaching roller assembly 60 to back frame 30. Additionally, crossbeam 61 may be any member that is capable of attaching shelf 40 to back frame 30.

Also attached to the forward edge 80 of crossbeam 61, in the embodiment shown, are stops 78. Stops 78 are typically manufactured from short sections of the same material that was used to form back frame 30 and shelf frame 42. These stops are welded, fastened, or bonded to the underside of the forward edge 80 of cross beam 61. Preferably, there are two stops, 78a and 78b. Each stop 78 is located between two crossbeam hinges 48. Thus, stop 78a is located between crossbeam hinges 48b" and 48b". Similarly, stop 78b is located between crossbeam hinges 48b" and 48b"'. These stops serve to prevent shelf 40 from dragging on the floor of the truck, container or other confined area when dolly 10a is loaded. Of course, there are many other ways in which to limit the position of shelf 40. Thus, stops 78 may be any device employed to hold shelf 40 in the desired position for carrying the selected load. Additionally, stops 78 may not be required for any embodiments where shelf 40 is attached to frame with a non-pivotal connection.

Figure 6:
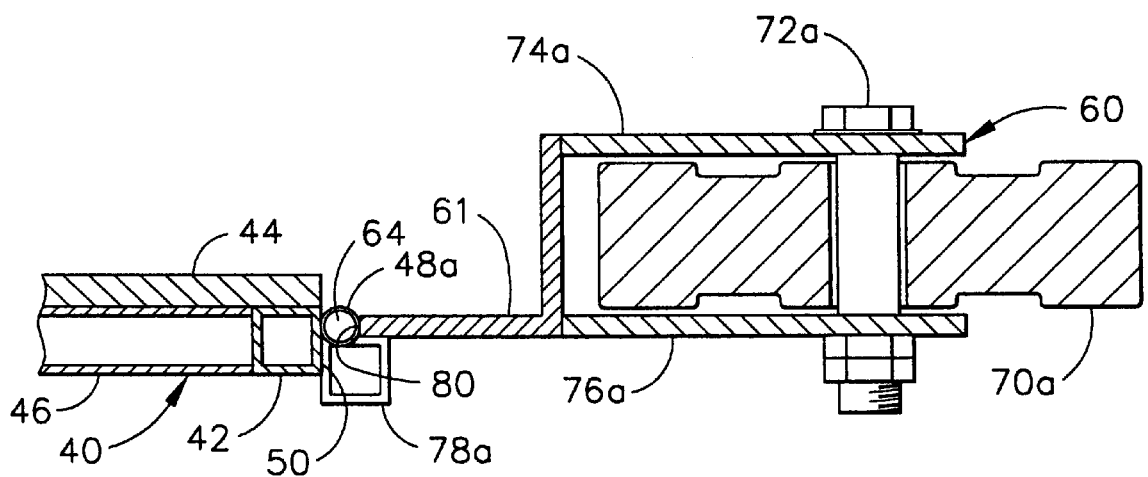
FIG. 6 is an enlarged fragmentary detailed view of the roller assembly and the connection between the roller assembly and the shelf.

If used, roller assembly 60 may be any device that is capable of reducing the force required to move dolly 10 by reducing the friction generated between back frame 30 and the side of the truck or other contained area. Typically, roller assembly 60 would not be used if slider 20 is not attached to a truck side or other generally vertical surface. With reference now to FIG. 6, which illustrates the detail of one embodiment of roller assembly 60 showing roller 70a (both rollers 70a and 70b of roller assembly 60 are shown in FIG. 1). Typically, each roller 70 is a round, wheel-like device. However, roller 70 may be any device that is capable of reducing the force required to move dolly 10 horizontally along the vertical surface by holding dolly 10 away from the truck side, container side, or other surface. For example, the roller(s) 70 may be orientated to ride on the vertical surface, the floor, or both the vertical surface and the floor. If the roller(s) 70 carry all the load in the vertical direction, then slider 40 would only need to prevent dolly 10 from tipping outward.

In the embodiment shown the roller(s) 70a and 70b roll on the vertical surface, and each roller 70a and 70b is fastened with a respective axle 72a and 72b to its respective upper roller frame 74a and 74b, and lower roller frame 76a and 76b. Each upper and lower caster frame 74a and 74b, 76a and 76b, are formed from flat plates and are welded to crossbeam 61.

Typically, sliding dolly 10a is stored by moving sliding dolly 10a to the rear of the truck and folding the shelf 40 up against back frame 30. With the sliding dolly 10a in the folded position (i.e., the shelf 40 proximate back frame 30), the sliding dolly 10a is tied against the side of the truck with standard tie-down straps to prevent sliding dolly 10a from shifting while the truck is moving. Preventing the dolly 10a from shifting prevents damage both to the goods being carried, as well as to the dolly 10a.

When it is desired to unload the truck, the sliding dolly 10a is untied and shelf 40 is folded down to its operating position. Typically, shelf 40 will have a slight incline towards back frame 30. In this position, the dolly 10a can be slid in the truck, container, or other confined area to a position proximate the mattress, box spring or other object to be loaded on sliding dolly 10a. After loading the sliding dolly 10a, it is a simple matter for the truck driver, warehouse worker, or other user to move the dolly 10a and the mattress, box spring or package from its position inside the truck, container, or other area to the end of the slider where the mattress, box spring or other package may be easily handled and moved to another location. Typically, this movement would be by forklift or other mechanized means. As can be readily seen, the use of the sliding dolly 10a will enable a truck driver or warehouse worker to easily and safely move a mattress, box spring or other cumbersome package from anywhere within a truck (a confined area), to the end of the truck. Consequently, since the truck driver or warehouse worker will not have to carry a heavy and awkward item, that person is less likely to be injured in moving the goods during the loading or unloading of the truck.

Figure 7:
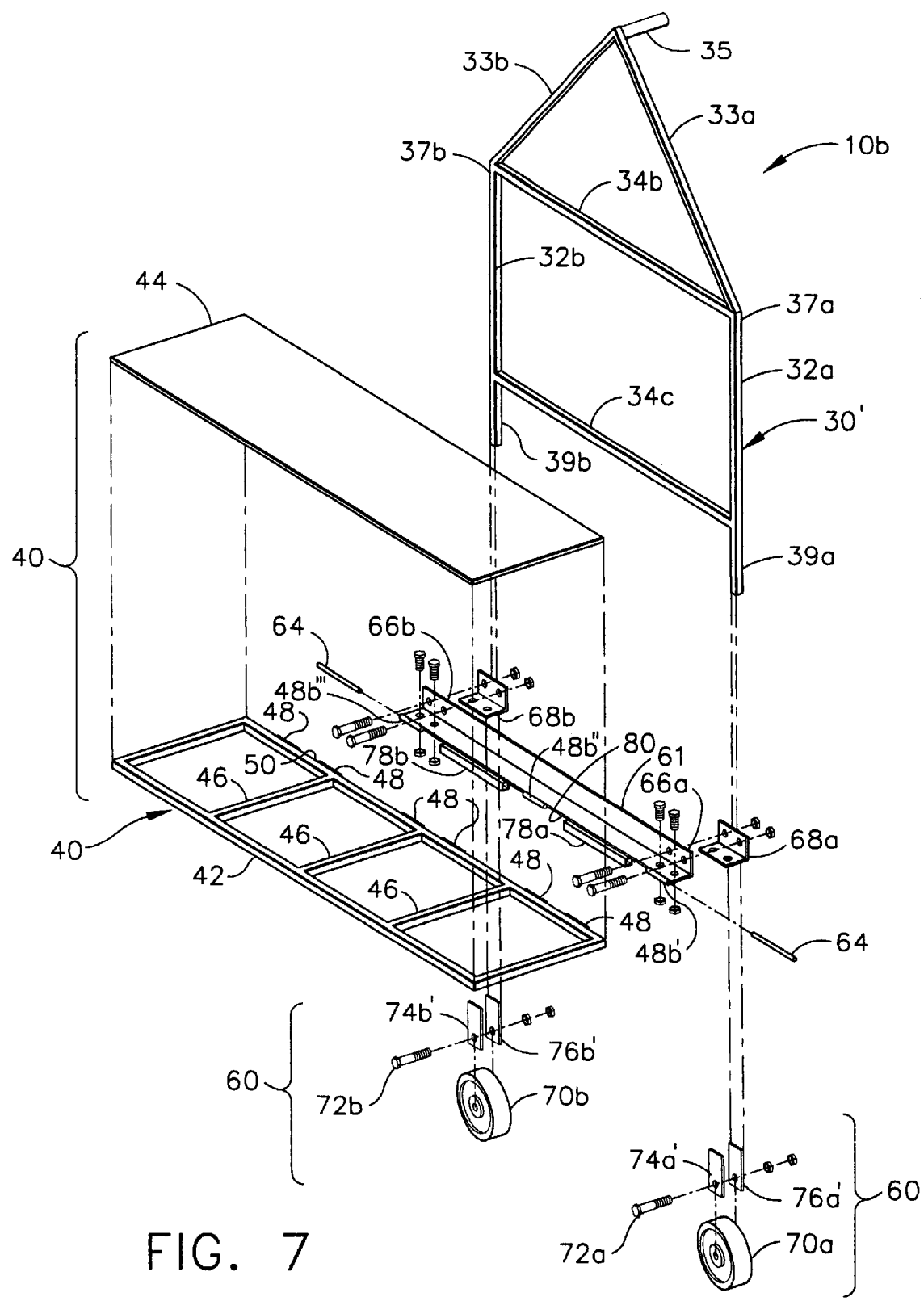
FIG. 7 is an exploded perspective view of a dolly in accordance with another embodiment of the present invention.
Figure 8:
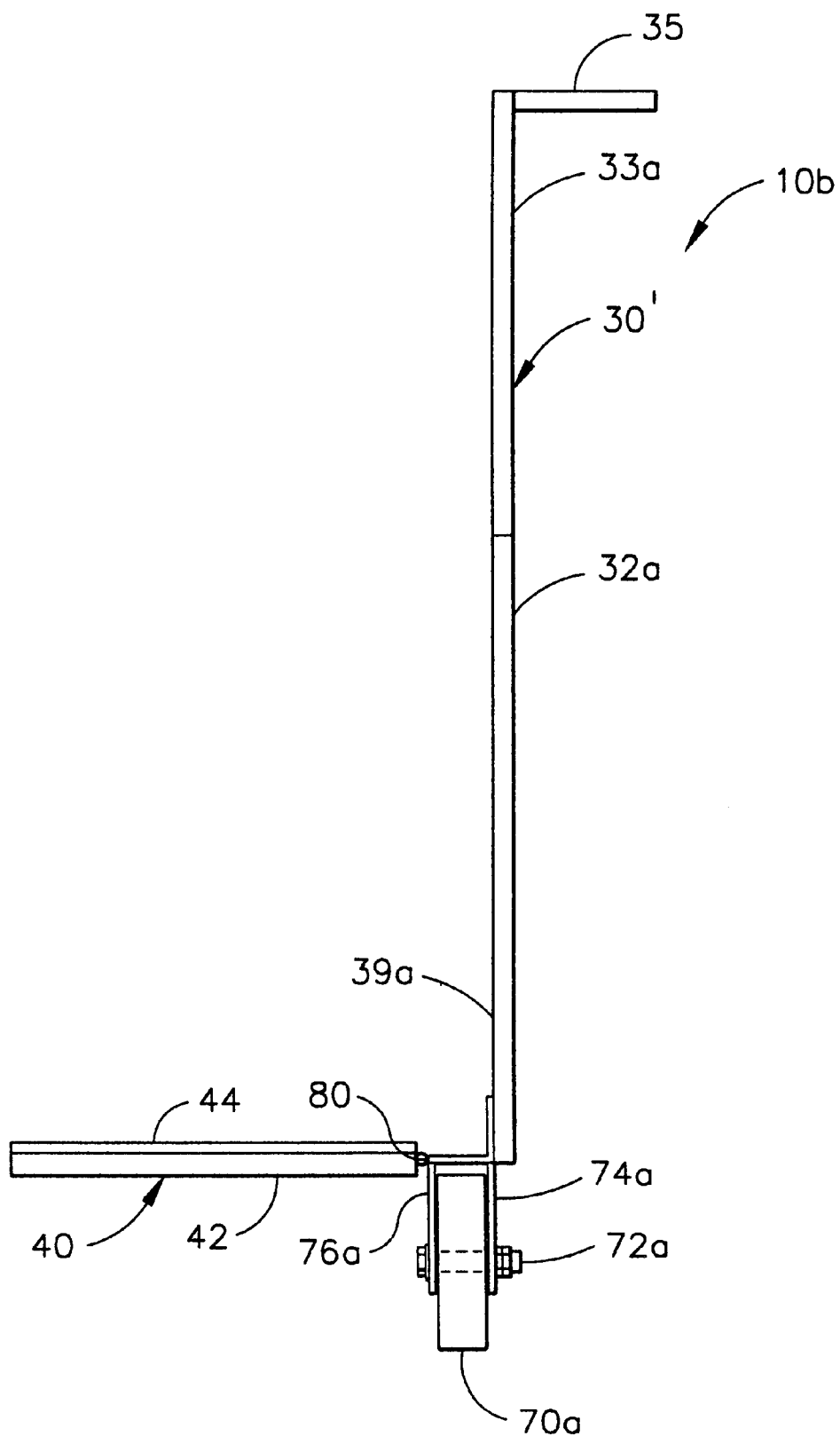
FIG. 8 is a side view of the dolly shown in FIG. 7.

With reference now to FIGS. 7 and 8 showing another embodiment of sliding dolly 10b that is similar to a conventional hand dolly with the axis of rotation of the wheels turned ninety degrees. The embodiment shown has a modified back frame 30', shelf 40, and roller assembly 60. Both the shelf 40 and roller assembly 60 are joined to the back frame 30'. The roller assembly 60 includes at least one roller 70 that is capable of supporting the dolly 10b above a surface such as a warehouse, truck, or container floor.

As can be seen from FIGS. 7 and 8, the construction of this embodiment to that discussed above, with several notable differences. For the back frame 30', the slider 20 is replaced with handle 35. Additionally, the roller assembly 60 is typically orientated in a generally downward direction.

Support frame 30' can be any configuration of members that will provide adequate support for the load being carried on sliding dolly 10b. In the embodiment shown, support frame 30' has two vertical supports 32a and 32b and two crosspieces 34b and 34c. Each end of each crosspiece 34 is welded, joined or otherwise fastened to each vertical support 32. Crosspieces 34 may divide vertical supports 32 in approximately equal length sections. Each vertical support 32a and 32b has a respective handle end 37a and 37b that may be connected to a respective handle brace 33a and 33b. One end of each handle brace 33a and 33b may be connected together. Typically, this connection is by welding, however, threaded fasteners, adhesives, or other means compatible with the materials to be connected could be used.. Typically, handle 35 is joined to the connection between brace 33a and brace 33b. In some embodiments, handle braces 33 will not be used. If handle braces 33 are not used, then the upper most crosspiece 34 could be used as a handle, the handle 35 could be joined to the crosspiece 34 instead of braces 33, or some other means for holding dolly 10b could be used. Typically, handle 35, and braces 33 are manufactured from the same or similar materials as the vertical supports 32.

Roller assembly 60 may be any device that is capable of reducing the force required to move dolly 10b over a floor or other generally horizontal surface. With reference now to FIG. 8, the embodiment shown has rollers 70a and 70b of roller assembly 60 joined to crossbeam 61. Typically, each roller 70 is a round, wheel-like device. However, roller 70 may be any device that is capable of supporting dolly 10b above a surface. For example, caster, roller bearing, or ball bearing assemblies could be employed to permit the dolly 10b move in any direction over the supporting surface. Additionally, the axis of rotation each roller 70 may be at any angle, provided that roller(s) 70 will permit the dolly 10b to move in a direction generally to the plane of back frame 30. In the embodiment shown, each roller 70b is fastened with a respective axle 72 to its respective upper roller frame 74 and lower roller frame 76. Each upper and lower caster frame 74a and 74b, 76a and 76b, are formed from flat plates and are welded or otherwise joined to cross-beam 61 or reinforcing plates 68. The roller assembly 60 may be joined to either back frame 30' or shelf 40. The roller assembly 60 is orientated to permit the direction of motion to be substantially parallel to the long axis of shelf 40. Thus, in the preferred embodiment the rollers 70 are orientated approximately ninety degrees from the wheels or rollers used in a conventional dolly or hand truck. The embodiment shown uses two rollers 70a and 70b each attached near its respective end 66a and 66b. The rollers 70a and 70b shown above have generally flat rolling surfaces, however, any shaped surface may be used. For applications where the dolly is tipped or the rollers 70 are at an angle, a semi-circular shape will be desired. Embodiments using one or more rollers 70 to support dolly 10b are within the scope of this disclosure. The larger the number of rolls 70 employed to support dolly 10b the larger the force that will be required to turn sliding dolly l0b. If a single roller 70 is used, the roller would typically be located near the middle of the crossbeam 61 and the operator would be required to balance the load along two planes (i.e. for both pitch and roll).

Typically, sliding dolly 10b is stored by moving the sliding dolly 10b to a storage location and folding the shelf 40 up against support frame 30'.

The sliding dolly 10b is used by moving the dolly 10b to a convenient position proximate the mattress, box spring, or other package to be moved. The selected item is placed on the shelf 40 of dolly 10b and the operator will pull the handle 35 of dolly 10b and/or the object being carried, to lift shelf 40 and the item being carried off the floor or other surface. The operator could then push the loaded dolly 10b to the desired location.

In summary, numerous benefits have been described that result from employing the concepts of the invention. The foregoing description of the invention has been presented for the purpose of illustration and description. It is not intended to be exhaustive or to limit the invention to precise form disclosed. Obvious modifications or variations are possible in light of the above teachings. These embodiments were chosen and described in order to best illustrate the principles of the invention and its practical application to thereby enable one of ordinary skill in the art to best utilize the invention and various embodiments with various modifications as are suited to the particular use contemplated. It is intended that the scope of the invention be defined by the claims appended hereto.

What is claimed is:

1. A sliding dolly for transporting an item spaced from a first surface, said sliding dolly comprising:
   a. a generally planar back frame having oppositely oriented first and second sides, said first side generally defining a first plane, said back frame having an upper end and a lower end;
   b. a shelf carried by said back frame, said shelf configured to support a lower surface of said item, said shelf extending said from first side of said back frame in a direction away from said second side, whereby substantially all of said item is supported only on said first side of said back frame;
   c. a friction reducing device carried by said back frame adjacent said lower end, said friction reducing device configured to maintain said lower end of said back frame in a spaced apart relationship relative to said first surface when said back frame is moved in direction of travel, said direction of travel being generally parallel to said first surface.

2. The sliding dolly of claim 1, wherein said friction reducing device contacts said first surface.

3. The sliding dolly of claim 1, wherein said friction reducing device is carried by said back frame by being carried by said shelf.

4. The sliding dolly of claim 1, wherein said friction reducing device comprises at least one wheel extending from said back frame, each of said at least one wheel having a respective axis of rotation, said respective axis of rotation being perpendicular to said direction of travel.

5. The sliding dolly of claim 4, wherein said at least one wheel comprises a plurality of wheels.

6. The sliding dolly of claim 5, wherein each of said plurality of wheels has a respective plane within which said wheel rotates, each respective plane of each of said plurality of wheels being coplanar.

7. The sliding dolly of claim 6, wherein said first surface is approximately vertical.

8. The sliding dolly of claim of claim 7, wherein said plurality of wheels are configured to engage said first surface.

9. The sliding dolly of claim 7, wherein said plurality of wheels are configured to engage a second surface, said second surface being generally horizontal.

10. The sliding dolly of claim 6, further comprising a slider, said slider connected to said upper end of said back frame, said slider configured to be attached to said first surface.

11. The sliding dolly of claim 10, wherein said item has a weight, said plurality of wheels is configured to carry substantially all of the weight of said item, and said slider is configured to prevent said upper end of said back frame from tipping outward from said first surface.

12. The sliding dolly of claim 6, wherein said first surface is generally horizontal.

13. The sliding dolly of claim 12, further comprising a handle adjacent said upper end.

14. The sliding dolly of claim 1, wherein said shelf comprises a single member.

15. A truck in combination with a sliding dolly for transporting an item within said truck spaced above a floor of the said truck, said truck including a sidewall disposed generally perpendicular to said floor, said floor intersecting said sidewall generally along a first line, said sliding dolly comprising:
   a. a generally planar back frame having oppositely oriented first and second sides, said first side generally defining a first plane, said back frame having an upper end and a lower end;
   b. a slider carried by said sidewall, said slider connected to said upper end of said back frame, said slider configured to support said back frame;

c. a shelf carried by said back frame, said shelf configured to support a lower surface of said item, said shelf extending said from first side of said back frame in a direction away from said second side, whereby substantially all of said item is supported only on said first side of said back frame;

d. a friction reducing device carried by said back frame adjacent said lower end, said friction reducing device configured to maintain said lower end of said back frame in a spaced apart relationship relative to said sidewall when said back frame is moved in direction of travel, said direction of travel being generally parallel to said first line.

16. The truck of claim 15, wherein said friction reducing device comprises at least one wheel extending from said back frame, said at least one wheel engaging said sidewall along a second line which is generally parallel to said first line.

17. The truck of claim 16, wherein each of said at least one wheel has a respective plane within which said wheel rotates, each respective plane being generally parallel to said floor.

18. The truck of claim 16, wherein said at one wheel comprises a plurality of wheels, each of said plurality of wheels having a respective plane within which said wheel rotates, each respective plane of each of said plurality of wheels being coplanar.

19. The truck of claim 15, wherein said friction reducing device comprises at least one wheel extending from said back frame, said at least one wheel engaging said floor along a second line which is generally parallel to said first line.

20. The truck of claim 19, wherein each of said at least one wheel has a respective plane within which said wheel rotates, each respective plane being generally parallel to said sidewall.

* * * * *